United States Patent
Miyamoto

(10) Patent No.: US 6,995,367 B2
(45) Date of Patent: Feb. 7, 2006

(54) NANOTUBE, NEAR-FIELD LIGHT DETECTING APPARATUS AND NEAR-FIELD LIGHT DETECTING METHOD

(75) Inventor: Yoshiyuki Miyamoto, Tokyo (JP)

(73) Assignee: NEC Corporation, (JP)

( * ) Notice: Subject to any disclaimer, the term of this patent is extended or adjusted under 35 U.S.C. 154(b) by 322 days.

(21) Appl. No.: 10/418,237

(22) Filed: Apr. 17, 2003

(65) Prior Publication Data
US 2003/0197120 A1   Oct. 23, 2003

(30) Foreign Application Priority Data
Apr. 18, 2002   (JP)   ............ 2002-116148

(51) Int. Cl.
*G01N 23/00*   (2006.01)
(52) U.S. Cl. .................. 250/306; 73/105; 977/DIG. 1
(58) Field of Classification Search ............. 250/234, 250/216, 307, 306, 309–311; 73/105; 977/DIG. 1
See application file for complete search history.

(56) References Cited

FOREIGN PATENT DOCUMENTS

| JP | 08-086789 | 4/1996 |
| JP | 10 170523 | 6/1998 |
| JP | 2001-033464 | 2/2001 |
| JP | 2001-281124 | 10/2001 |
| JP | 2001-305038 | 10/2001 |
| JP | 2002-214112 A * | 7/2002 |

OTHER PUBLICATIONS

Huang, Z.P., "Growth of Highly Oriented Carbon Nanotubes by Plasma-Enhanced Hot Filament Chemical Vapor Deposition" Applied Physics Letters, Dec. 28, 1998, pp. 38453847.

Soh, Hyongsok T., "Integrated Nanotube Circuits; Controlled Growth and Ohmic Contacting of Single-Walled Carbon Nanotubes" Applied Physics Letters, Aug. 2, 1998, pp. 627-629.

Iijima, Sumio, "Structural Flexibility of Carbon Nanotubes" American Institute of Physica 1996, pp. 2089-2092.

* cited by examiner

*Primary Examiner*—Thanh X. Luu
(74) *Attorney, Agent, or Firm*—Hayes Soloway P.C.

(57) ABSTRACT

A near-field light detecting apparatus providing a high spatial resolution comprises a near-field light sensor for converting near-field light from the surface of a sample into an electric signal, and a voltage source for applying a predetermined voltage to the near-field light sensor through wires. The near-field light sensor comprises a nanotube which has an insulating property in a predetermined area. Electronic excitation is induced by the near-field light in two areas separated by the insulating area to convert the near-field light into the electric signal.

27 Claims, 12 Drawing Sheets

NANOTUBE, NEAR-FIELD LIGHT DETECTING APPARATUS AND NEAR-FIELD LIGHT DETECTING METHOD

BACKGROUND OF THE INVENTION (1) Field of the Invention

The present invention relates to a nanotube, a near-field light detecting apparatus and a near-field light detecting method which are capable of detecting near-field light (evanescent light). The present invention also relates to an apparatus for analyzing or observing a surface state (shape, characteristics or the like) of a sample by use of near-field light.

(2) Description of the Prior Art

When light is incident on a boundary surface which has a varying refractive index at an angle which causes total reflection (generally, at an angle of refraction equal to or larger than 90 degrees), the incident light is totally reflected on the boundary surface (reflection plane), in which case the light exudes to the opposite side of the reflection plane. This exuding light is called "near-field light." Other than the foregoing, the near-field light also includes light which exudes from a miniature aperture smaller than the wavelength of the light, through which the light is passed.

The near-field light can be utilized to analyze a surface state (shape, characteristics or the like) of a sample such as semiconductor materials, organic or inorganic materials, vital samples (cells) and the like. An ordinary optical microscope cannot measure a sample at a resolution higher than the wavelength of light due to diffraction of the light. This is called "diffraction limit of light." Since an analysis utilizing near-field light permits measurements at a resolution exceeding the diffraction limit of light, a variety of analyzers based on near-field light have been under investigation in recent years.

A near-field optical microscope is known as one of the state analyzers which utilize near-field light. In dominating near-field optical microscopes, glass fiber is used to constitute a part (opening) which receives near-field light produced on the surface of a sample. In such a near-field optical microscope, near-field light emitted from the surface of an object under measurement is transformed into ordinary light which is led to an optical signal processing unit through the glass fiber. Then, the ordinary light is converted into an electric signal in the optical signal processing unit for signal processing. In this event, since the near-field optical microscope must have an opening sized to be equivalent to the wavelength of the light for the transformation of near-field light into ordinary light and the propagation of ordinary light through the glass fiber, the opening must be sized on the order of microns.

Other than the foregoing near-field optical microscope, JP-A-10-170523 describes a scanning probe microscope. FIG. 1 generally illustrates the configuration of the scanning probe microscope.

Quartz plate 92 which carries sample 83 on the surface thereof is fixed on holder 93. Objective lens 94, light chopper 96 and light source 95 are disposed on the back side of quartz plate 92. Light from light source 95 sequentially passes through light chopper 96 and objective lens 94, and is irradiated onto the back of quartz plate 92 at a predetermined incident angle, i.e., at an angle at which near-field light is produced.

Probe cantilever 81 is disposed opposite to the surface of sample 83. Probe cantilever 81 is supported by three-dimensional driving mechanism 85 through laminated piezo element 82, and has a portion connected to capacitor sensor 90 through copper line 89. The output of capacitor sensor 90 is supplied to lock-in amplifier 91.

Three-dimensional driving mechanism 85 comprises semiconductor laser 86 for illuminating a predetermined part of probe cantilever 81, and bisected photodetector 87 disposed in a direction in which light from semiconductor laser 86 travels after it is reflected at the predetermined part. The output of bisected photodetector 87 is supplied to lock-in amplifier 88.

Laminated piezo element 82, which vibrates probe cantilever 81 in a direction perpendicular to the surface of sample 83, is supplied with a voltage signal from signal generator 84 for controlling the vibrations. Signal generator 84 supplies a reference signal at a preset frequency to lock-in amplifiers 88, 91, and supplies an operation command signal at a preset frequency to a light chopper 96, in addition to supplying the voltage signal to laminated piezo element 82. Each of lock-in amplifiers 88, 91, three-dimensional driving mechanism 85, and signal generator 84 is connected to controller 97.

FIG. 2 generally illustrates probe cantilever 81. Probe cantilever 81 comprises support 121 made of Pyrex glass; lever 126 having one end supported by support 121; and probe 127 formed at the other end of lever 126. Probe 127 is made up of silicon nitride 122, metal film 123 and photoconductive film 124 laminated in sequence with a V-shaped cross section. Photoconductive film 124, even though it is an insulating material, when it is not irradiated with light, behaves as a conductor in area 125 at the leading end of probe 127 (pointed end) when near-field light from sample 83 is supplied to area 125. Because of this characteristic of photoconductive film 124, near-field light incident on area 125 causes a change in the capacitance between metal film 123 and a surrounding conductor in probe cantilever 81. This change in the capacitance follows the intensity of the incident near-field light.

The scanning probe microscope illustrated in FIG. 1 takes advantage of a change in the capacitance due to the difference in the intensity of near-field light in probe cantilever 81 to observe the surface of sample 83 in the following manner.

Piezo element 82 vibrates probe cantilever 81 at a frequency ω1, near its resonant frequency, causing lock-in amplifier 88 to measure the amplitude of vibrations of a component at frequency ω1 in lever 126 from the result of a detection made by bisected photodetector 87. Controller 97 scans probe cantilever 81 on the surface of sample 83 as it controls three-dimensional moving mechanism 85 to move probe cantilever 81 such that the component at frequency ω1 presents a constant amplitude of vibrations. This control results in a constant distance held between probe 127 of probe cantilever 81 and the surface of sample 83.

Light from light source 95, on the other hand, is modulated by light chopper 96 at a frequency ω2. The modulated light is irradiated to the back of quartz plate 92 to produce near-field light on the surface of sample 83. Then, probe cantilever 81 is scanned on the surface of sample 83 to detect a change in the intensity of the near-field light in an in-plane direction (intensity distribution). Specifically, the change in the intensity of the near-field light is detected by lock-in amplifier 91 as a component at frequency (ω2−ω1) within a change in the capacitance in probe cantilever 81.

Controller 97 creates an image indicative of the intensity distribution of the near-field light on the surface of sample 83 from the result of the detection made by lock-in amplifier 91, and displays the image on a display device, not shown.

Other than the foregoing microscope, JP-A-2001-281124 describes a probe having a carbon nanotube for use with a scanning near-field optical microscope (SNOM). FIG. 3a generally illustrates the configuration of the SNOM probe, and FIG. 3b illustrates a cross-sectional view taken along a line A–A' in FIG. 3a.

As illustrated in FIG. 3a, the SNOM probe has a cantilever 102 which extends from cantilever base 101 in a predetermined direction, and a tip (probe) 103 at the leading end of cantilever 102. As illustrated in FIG. 3b, tip 103 is a hollow element in the shape of a quadrangular pyramid which has a square face with the dimensions of 1 μm×1 μm at the leading end. An aperture 103a is formed through the square face around the center thereof. A mounting groove 104a is formed on an edge of the leading end of tip 103 for mounting carbon nanotube 104 which extends substantially in the vertical direction from the square face at the leading end. Carbon nanotube 104 is electrically conductive.

A scanning probe microscope using the foregoing SNOM probe involves two operations: a first operation as an atomic force microscope (AFM) which uses a carbon nanotube, and a second operation as a scanning near-field optical microscope which uses a tip 103. In the first operation, cantilever 102 of the SNOM probe is vibrated near the resonant frequency, and the distance between carbon nanotube 104 and sample 83 is controlled by an actuator such as a piezo element such that the amplitude of vibrations receives constant attenuation or a phase shift. This is used to measure asperities on the surface of sample 83. In the second operation, the vibration of cantilever 102 is stopped, and sample 83 is scanned while the distance between opening 103a of tip 103 and the surface of sample 83 is controlled with reference to the result of the measurement (asperity information) provided by the first operation. Simultaneously, light is converged to aperture 103a from the back of tip 103 to produce near-field light in the vicinity of aperture 103a, and the surface of sample 83 is excited by the produced near-field light for observation.

When glass fiber is used to constitute the part (opening) which receives near-field light produced on the surface of a sample, the spatial resolution depends on the size of the opening. Since the glass fiber must propagate ordinary light transformed from near-field light, it is impossible to reduce the diameter of the glass fiber to the wavelength of ordinary light or less. Since the size of the opening corresponds to the diameter of the glass fiber, the conventional microscope cannot provide spatial resolution higher than the wavelength of ordinary light. For this reason, when near-field light is utilized to observe the surface of a sample, for example, a VLSI (very large scale integrated circuit) device, an element which is machined using the VLSI manufacturing technology, and the like, the microscope fails to provide a spatial resolution high enough to identify a part at which near-field light is produced. In addition, when near-field light is utilized to evaluate materials, it is difficult to locate a near-field light emitter at a molecular level.

In the scanning probe microscope described in JP-A-10-170523, the spatial resolution is determined by the size of area 125 at the tip of probe 127 (pointed end) of probe cantilever 81, so that the spatial resolution can be increased by reducing area 125. However the silicon nitride 122, which forms part of area 125, must be generally doped with a certain amount of impurities, so that in this structure, a sufficient thickness should be ensured for silicon nitride 122 in order that near-field light incident on the silicon nitride 122 to permit the silicon nitride to act as a conductor. Since there is a restriction on the reduction in the size of area 125, it is likewise difficult to accomplish a spatial resolution high enough to permit the identification of a part at which the near-field light is produced and the location of a near-field light emitter at a molecular level. Also the silicon nitride 122, when extremely thinned down, would give rise to another problem in that area 125 could be partially damaged when probe 127 comes into contact with the surface of a sample.

With the SNOM probe described in JP-A-2001-281124, the spatial resolution is determined by the size of aperture 103a in tip 103. Although the spatial resolution can be increased by reducing aperture 103a, it is again difficult to achieve a spatial resolution high enough to permit the identification of a part at which near-field light is produced, and the location of a near-field light emitter at a molecular level.

SUMMARY OF THE INVENTION

It is an object of the present invention to provide a nanotube, a near-field light detecting apparatus and a near-field light detecting method which achieve a spatial resolution high enough to solve the respective problems mentioned above and to support evaluations and analyses on further miniaturized areas.

It is another object of the present invention to provide a state analyzing apparatus and a near-field optical microscope which comprise the nanotube as mentioned above.

To achieve the above object, a nanotube according to the present invention is configured to convert near-field light into an electric signal, characterized by including an insulating area, and a first and a second area separated by the insulating area, wherein the near-field light induces electronic excitation in the first and second areas to convert the near-field light into the electric signal.

A near-field light detecting apparatus according to the present invention is characterized by including a nanotube having an insulating area and a first and a second area separated by the insulating area, a voltage source for applying a predetermined bias voltage to the nanotube, and detecting means for detecting a first current generated by the application of the predetermined bias voltage and flowing through the nanotube, and a second current generated by electronic excitation induced by external near-field light in the first and second areas and flowing through the nanotube.

A near-field light detecting method according to the present invention uses a nanotube having an insulating area and a first and a second area separated by the insulating area, and is characterized by including the steps of applying a predetermined bias voltage between the first and second areas of the nanotube, measuring a first current generated by the application of the predetermined bias voltage and flowing through the nanotube, and measuring a second current generated by electronic excitation induced by near-field light under detection in the first and second areas and flowing through the nanotube.

A state analyzing apparatus according to the present invention is characterized by including a nanotube having an insulating area and a first and a second area separated by the insulating area, a voltage source for applying a predetermined bias voltage to the nanotube, detecting means for detecting a first current generated by the application of the predetermined bias voltage and flowing through the nanotube, and a second current generated by electronic excitation induced in the first and second areas by near-field light produced on the surface of a sample and flowing through the nanotube, and analyzing means for analyzing a state on the surface of the sample based on the first and second currents detected by the detecting means.

A scanning near-field optical microscope according to the present invention is characterized by including a nanotube having an insulating area and a first and a second area separated by the insulating area, a voltage source for applying a predetermined bias voltage to the nanotube, detecting means for detecting a first current generated by the application of the predetermined bias voltage and flowing through the nanotube, and a second current generated by electronic excitation induced in the first and second areas by near-field light produced on the surface of a sample and flowing through the nanotube, a probe having the nanotube mounted at the leading end thereof, movement control means for scanning the probe in a predetermined direction while maintaining a constant distance between the nanotube and the surface of the sample, and image generating means for generating an image of the near-field light related to the surface of the sample based on the first and second currents detected by the detecting means.

In the present invention as described above, the electronic excitation is induced by near-field light in the first and second area of the nanotube to convert the near-field light into an electric signal. Specifically, the second current is generated by the electronic excitation induced in the first and second areas by the near-field light. The generated second current is larger than a tunnelling current (first current) which is generated by applying a predetermined bias voltage between the first and second areas, and the magnitude of the second current varies in response to the intensity of the near-field light. It is therefore possible to detect the near-field light by detecting the second current.

In the foregoing configuration, since the second current is not generated when the near-field light falls out of a part comprised of the first and second areas and the insulating area, the spatial resolution is determined by the size of the part. For example, when the nanotube has a diameter of several tens of angstrom, the part has an effective size as small as several tens of angstrom. In this way, according to the present invention, the spatial resolution can be improved on the order of several tens of angstrom, thereby permitting the identification of a part at which near-field light is produced, and the location of a near-field light emitter at a molecular level, as previously described in the paragraph "Description of the Prior Art."

The above and other objects, features, and advantages of the present invention will become apparent from the following description with reference to the accompanying drawings which illustrate examples of the present invention.

BRIEF DESCRIPTION OF THE DRAWINGS

In the accompanying drawing(s):

FIG. 3b is an enlarged cross-sectional view taken along a line A–A' in FIG. 3a;

DESCRIPTION OF THE PREFERRED EMBODIMENTS

Next, embodiments of the present invention will be described with reference to the accompanying drawings.

Figure 4:
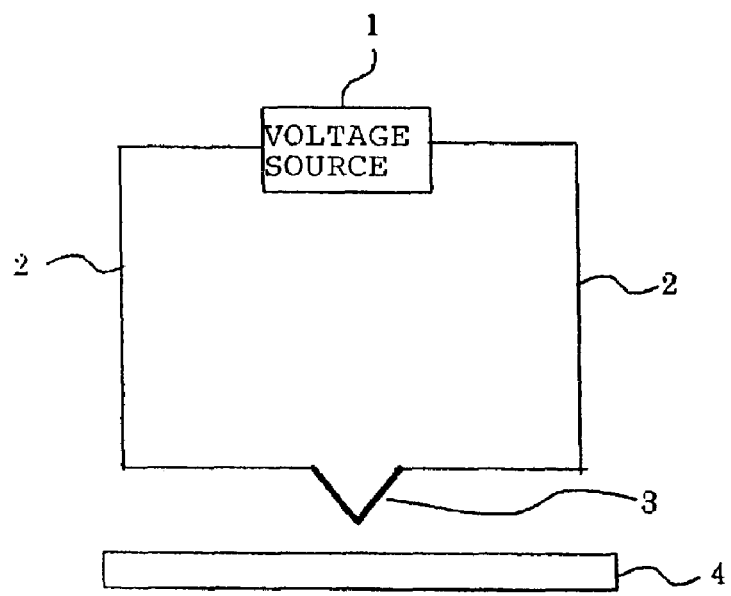
FIG. 4 is a block diagram illustrating a main portion of a near-field light detecting apparatus according to one embodiment of the present invention.

FIG. 4 illustrates a main portion of a near-field light detecting apparatus according to one embodiment of the present invention. The illustrated near-field light detecting apparatus comprises near-field light sensor 3 having a bent nanotube for converting near-field light from the surface of sample 4 into an electric signal; wire 2; and voltage source 1 for applying a predetermined voltage across the nanotube of the near-field light sensor 3 through wire 2.

The nanotube, which constitutes a near-field light detector 3, comprises an insulator section in a predetermined part (bent section) which has a predetermined energy band gap. As near-field light from the surface of sample 4 is incident on the vicinity of the bent section, the incident near-field light induces an electronic excitation in each area separated by the insulator section, thereby generating electrons and holes. The generation of electrons and holes causes a weak current to flow through wire 2 toward voltage source 1. In this way, the near-field light is converted into a weak current (photoelectric conversion) in the nanotube, so that the near-field light from the surface of the sample 4 can be measured by detecting the weak current. A known ampere meter may be used for detecting the weak current flowing through wire 2.

In the following, the principle of nanotube based photoelectric conversion will be described in brief.

Figure 5:
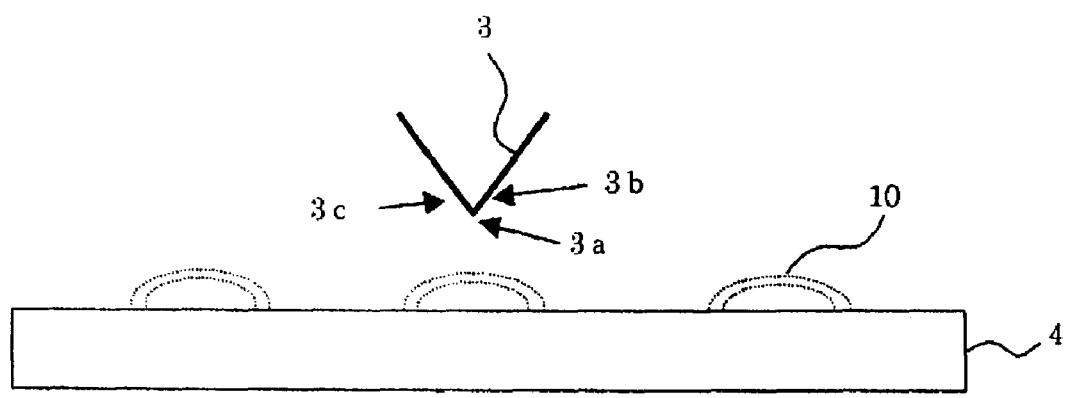
FIG. 5 is a schematic diagram showing how near-field light is detected by a bent nanotube which constitutes a near-field sensor shown in FIG. 4.
Figure 6:
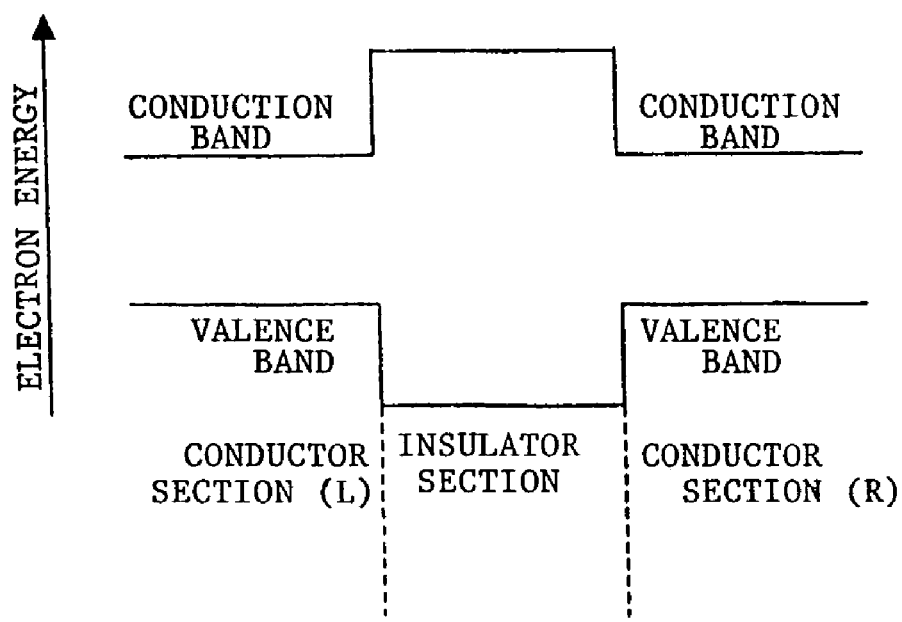
FIG. 6 is a schematic diagram showing an energy band structure in the vicinity of a bent section of the nanotube shown in FIG. 5.

FIG. 5 schematically shows how near-field light is detected by the bent nanotube which constitutes a near-field light sensor 3, and FIG. 6 shows an energy band structure in the vicinity of the bent section of the nanotube. Also, FIGS. 7a to 7d schematically show the relationship between the near-field light and a current flowing through the nanotube.

As illustrated in FIG. 5, a near-field light sensor 3 is made up of an insulator section 3a, and a conductor section (L) 3b and a conductor section (R) 3c adjacent to the left and right (on the left and right sides on the drawing sheet) of insulator section 3a, respectively, in the vicinity of a bent section of the nanotube. These sections involve the photoelectric conversion of near-field light produced on the surface of sample 4. The insulator section 3a has a band gap sufficiently larger than band gaps of conductor section (L) 3b and conductor section (R) 3c, as shown in FIG. 6. A predetermined bias voltage is applied between conductor section (L) 3b and conductor section (R) 3c. Here, the following description will be made on an exemplary operation when a negative potential is applied to conductor section (L) 3b.

Figure 7A:
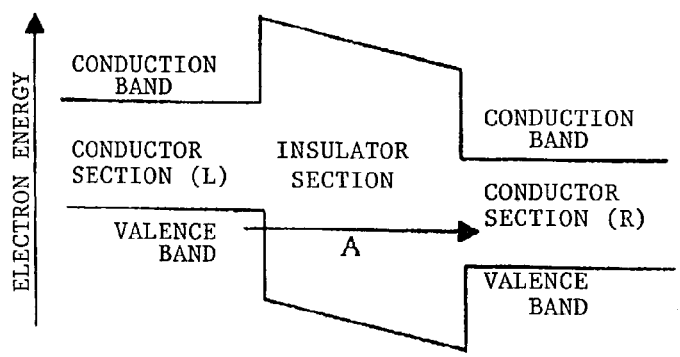
FIGS. 7a to 7d are schematic diagrams for explaining the relationship between near-field light and a current flowing through the nanotube.

(1) Without Near-Field Light:

For electrons, a negative potential increases the energy level, so that the level at a band end of conductor section (L) changes relative to the level at a band end of the conductor section (R), resulting in an electric field applied to the insulator section, as shown in FIG. 7a. Thus, a tunnelling current flows from conductor section (L) to the conductor section (R) in the valence band, as indicated by arrow A. This arrow A indicates the direction in which electrons flow, so that holes flow in the direction opposite to arrow A. Basically, a current flows corresponding to the flows of the electrons and the holes in the nanotube, however, in the following description, the flow of electrons is defined as the flow of current in order to avoid confusion.

In the state shown in FIG. 7a, the tunnelling electrons (indicated by arrow A) extend not beyond the band gap of conductor section (R), so that only a small current flows through the nanotube. If an excessively large bias voltage were applied between conductor sections (L) and (R), the electrons in the valence band of conductor section (L) would flow into the conduction band of conductor section (R), making it difficult to detect a change in a current generated by near-field light, as later described. For this reason, the bias voltage must be set within a range in which a small current merely flows through the nanotube, i.e., to such an extent that a change can be detected in the current caused by near-field light. Specifically, the bias voltage is preferably in a range of 0.1 V to 10 V. At this stage, no tunnelling current is generated because no carriers exist in the conduction band. However, as will be later described if the near-field light causes carriers to be excited in the conduction band, a tunnelling current will be generated more rapidly than in the valence band, resulting in a significant increase in the current flowing through the nanotube.

Figure 7B:
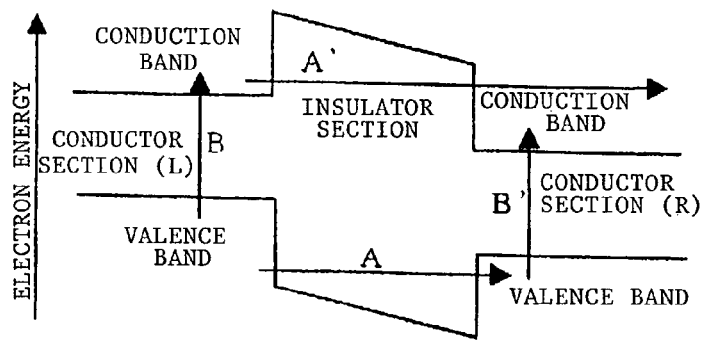

(2) With Near-Field Light (Electronic Excitation Induced both in Conductor Sections (L), (R)):

When near-field light 10 produced on the surface of sample 4 is incident over the entirety of insulator section, conductor section (L) 3b and the conductor section (R) 3c, the electronic excitation is induced by near-field light 10 in each of conductor section (L) and conductor section (R), as shown in FIG. 7b. Arrows B, B' in FIG. 7b indicate the processes of electronic excitation in conductor section (L) and conductor section (R), respectively. Then, electrons in the valence band of conductor section (L) flow to the level of conductor section (R) which is emptied by the electronic excitation (indicated by arrow A) through a tunneling phenomenon. Also, in the conduction band, a tunnelling current (indicated by arrow A') flows from conductor section (L) to conductor section (R). In FIG. 7b, arrow A' longer than arrow A indicates that electrons flow faster in the conduction band through the tunnelling phenomenon. In this way, the tunnelling current generated in the conduction band causes an increase in the amount of current flowing through the nanotube, as compared with the state (shown in FIG. 7a) in which no near-field light is incident.

Figure 7C:
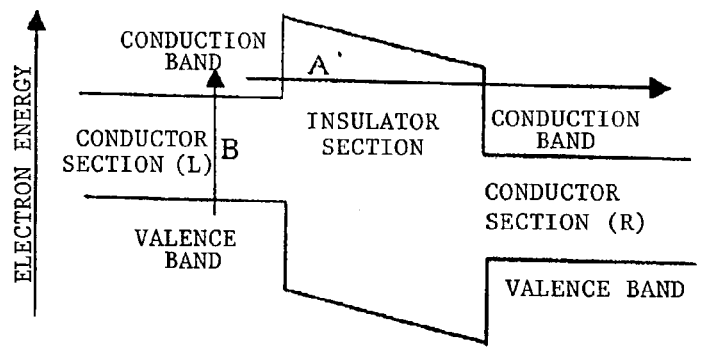

(3) With Near-Field Light (Electronic Excitation Induced only in Conductor Section (L)):

When near-field light 10 is incident only on conductor section (L) 3b, the electronic excitation is induced only in conductor section (L) (as indicated by arrow B), as shown in FIG. 7c. While this electronic excitation reduces carriers in the valence band of conductor section (L) to cause a decrease in a tunnelling current in the valence band, a tunnelling current (A') is generated instead in the conduction band. Again, the amount of current flowing through the nanotube increases over the state in which no near-field light is incident (state shown in FIG. 7a), but does not reach the amount of current generated in the state described in the foregoing paragraph (2).

Figure 7D:
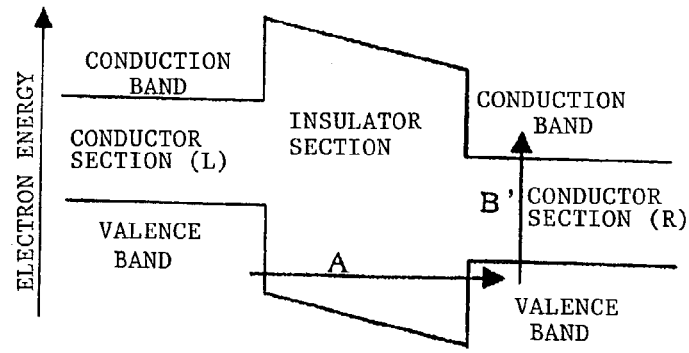

(4) With Near-Field Light (Electronic Excitation Induced only in Conductor Section (R)):

When near-field light 10 is incident only on conductor section (R) 3c, the electronic excitation is induced only in conductor section (R) (as indicated by arrow B'), as shown in FIG. 7d. Since no carriers are generated in the conduction band of conductor section (L), electrons in the valence band of conductor section (L) flow toward the holes emptied by the electronic excitation in conductor section (R) by the action of the tunnelling phenomenon (as indicated by arrow A). Again, the amount of current flowing through the nanotube increases over the state in which no near-field light is incident (state shown in FIG. 7a), but does not reach the amount of current generated in the state described in the foregoing paragraph (2) or (3).

The following relationship is established among the amounts of currents flowing through the nanotube in the states (1)–(4) described above in connection with FIGS. 7a–7d:

State (1)<State (4)<State (3)<State (2)

This relationship among the current amounts can be relied on to detect a spatial distribution of near-field light produced on the surface of sample 4. In this event, the spatial resolution is determined by the size of a portion comprised of insulator section 3a, conductor section (L) 3b and conductor section (R) 3c, but ideally the spatial resolution is substantially equal to the diameter of the nanotube. Therefore, when a desired spatial resolution is, for example, in a range of 10 to 100 Å, a nanotube for use in this case desirably has a diameter ranging from 10 to 100 Å.

Next a description will be made on the relationship between near-field light and the magnitude of a current flowing through the nanotube.

Figure 8:
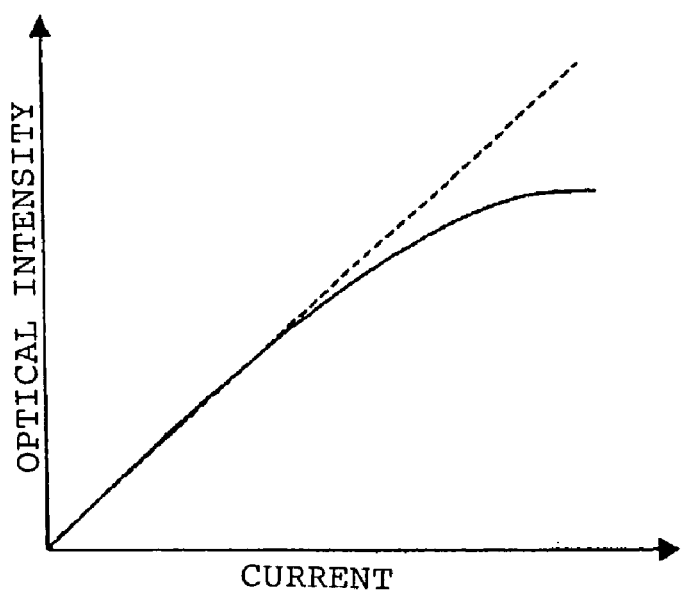
FIG. 8 is a characteristic graph showing the relationship between the intensity of near-field light and the magnitude of a current generated by photoelectric conversion.

FIG. 8 shows the relationship between the intensity of near-field light and the magnitude of a current generated by photoelectric conversion. Ideally, the number of carriers excited in the nanotube increases in proportion to the intensity of near-field light, causing an increase in the amount of current in proportion to the number of carriers (as indicated by a broken line in FIG. 8). Actually, however an excessive increase in carriers would cause a resistance due to scattering of carriers within the nanotube, so that the amount of current levels off as the intensity of near-field light exceeds a certain value (as indicated by a solid line in FIG. 8).

Because of the foregoing characteristic, the following considerations should be taken in designing of the nanotube. While a higher spatial resolution can be provided by employing a nanotube having a smaller diameter, this will result in a failure in detecting near-field light having a high intensity. On the other hand, while near-field light having a high intensity can be detected by a nanotube having a large diameter, the resulting spatial resolution is lower. Since the spatial resolution and the intensity of detectable near-field light are in a trade-off relationship as described above, the spatial resolution is desirably set in accordance with the intensity of near-field light intended for detection.

Next a specific description will be made on exemplary structures for the bent nanotube which constitutes a near-field light sensor 3.

Figure 9:
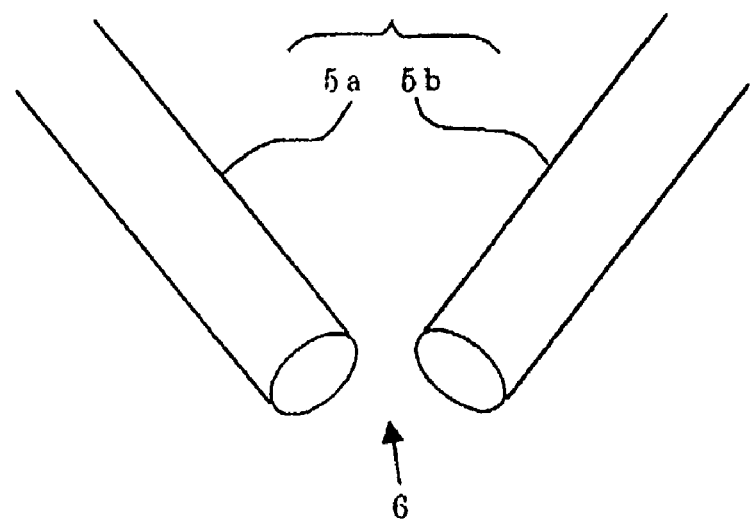
FIG. 9 is a schematic diagram illustrating a first embodiment of the near-field light sensor shown in FIG. 4.

FIG. 9 illustrates a first embodiment of a near-field light sensor 3 shown in FIG. 4. In this embodiment, near-field light sensor 3 comprises two carbon nanotubes 5a, 5b. The carbon nanotubes 5a, 5b are arranged in a V-shape with a gap 6 defined between two adjacent ends thereof. This gap 6 forms the bent insulator section. The carbon nanotubes 5a, 5b each have their other end connected to a voltage source 1 through a wire 2 shown in FIG. 4.

In the near-field light sensor according to the first embodiment, a current generated through the tunnelling phenomenon alone flows through wire 2 when no near-field light is incident. This is the same as the operation in "state (1)" described above.

As near-field light from a sample is incident in the vicinity of the gap 6, the electronic excitation is induced in portions of the carbon nanotubes 5a, 5b separated by gap 6, which receive the near-field light, to generate electrons and holes. The excited electrons flow toward voltage source 1 in an area having a higher Fermi level, while the holes generated by the excitation flow toward voltage source 1 in an area having a lower Fermi level, causing a larger current to flow through wire 2 than when the near-field light is not incident. This is the same as the operation in "state (2)" described above.

When near-field light is produced at a location away from gap 6, specifically, at a location several tens to several hundreds of angstroms away from gap 6, electronic excitation is induced only on one side of the areas separated by gap 6 (insulator section), causing a slightly larger current to flow through wire 2 than when the near-field light is not incident. However, the amount of the current is smaller than when near-field light is incident in the vicinity of gap 6. This is the same as the operation in "state (3) and state (4)" described above.

In the first embodiment described above, the spatial resolution is determined by the size of a combination of gap 6 and excited areas of carbon nanotubes 5a, 5b. While any size is available for gap 6 as long as it ensures the operations in states (1)–(4) described above, gap 6 is desirably sized to be approximate to the diameter of carbon nanotubes 5a, 5b from a viewpoint of a highest possible spatial resolution.

Next, description will be made on a procedure of fabricating near-field light sensor 3 illustrated in FIG. 9. The carbon nanotubes 5a, 5b must be well bonded to metal electrodes for connection with wires 2 at the ends opposite to gap 6. "Well bonded" used herein refers to bonding with a low contact resistance. Such bonding can be accomplished, for example, using a technique of manufacturing a carbon nanotube by a CVD method using a metal which serves as a catalyst of the carbon nanotube (see Hyongsok T. Soh, Calvin F. Quate, Alberto F. Morpugo, Charles M. Marcus, Jing Kong, and Hongjie Dai, Applied Physics Letters Vo. 75 (No. 5), pp627–629, 1999).

Figure 10:
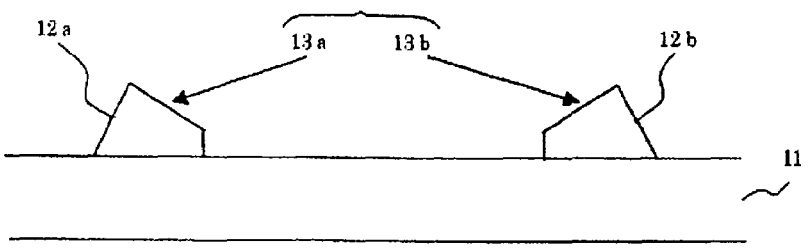
FIGS. 10a to 10c are process diagrams illustrating an exemplary procedure of fabricating the near-field sensor.
Figure 10:
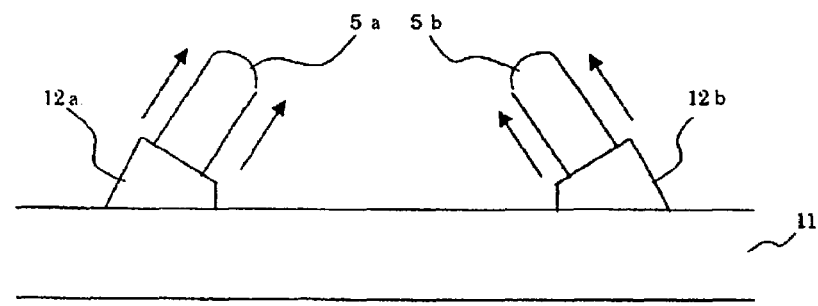
Figure 10:
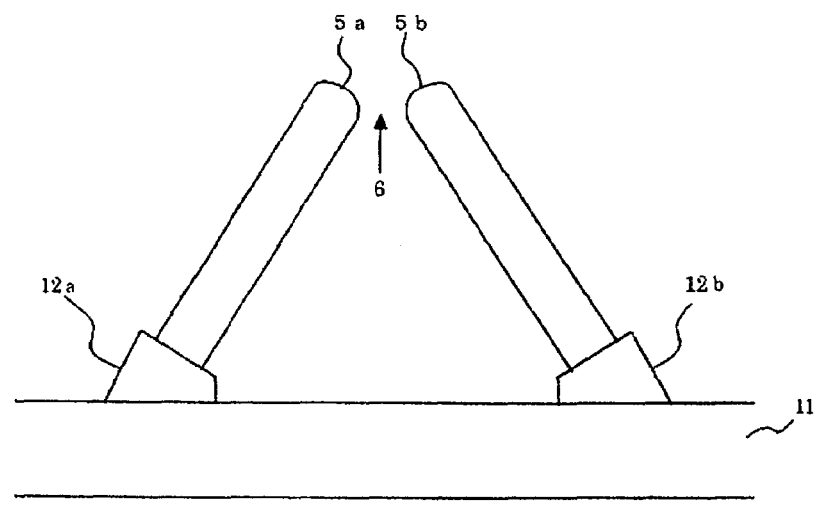

FIGS. 10a to 10c illustrate an exemplary procedure of fabricating the near-field light sensor using a catalyst metal. First, as shown in FIG. 10a, catalyst electrodes 12a, 12b are formed on substrate 11, followed by vapor deposition of a metal, which serves as a catalyst for the carbon nanotubes (catalytic metal), on the surfaces of the respective catalyst electrodes 12a, 12b to form nanotube growing surfaces 13a, 13b. The catalyst metal may be, for example, metallic nickel. It is known that when metallic nickel is used, a resulting nanotube has the property of growing in a direction perpendicular to the growing surface (Z. P. Huang, J. W. Xu, Z. F. Ren, J. H. Wang, M. P. Siegal and P. N. Provencio, Applied Physics Letters—Dec. 28, 1998—Volume 73, Issue 26, pp.3845–3847). Nanotube growing surfaces 13a, 13b are each set at an angle at which normals from predetermined parts (growing areas) on the respective surfaces intersect at a certain point above substrate 11.

Next, as illustrated in FIG. 10b the nanotubes are grown by CVD using hydrocarbon such as an acetylene gas. In FIG. 10b the arrows indicate directions in which the nanotubes grow. In this CVD growth which takes advantage of the property of the nanotube that grows in the direction perpendicular to the growing surface, a growth time is controlled to form a structure which has a gap 6 of a predetermined size, as illustrated in FIG. 10c. A gap 6 can be formed to have substantially the same size as the diameter of the nanotubes, provided that the spacing between catalyst electrodes 12a, 12b and inclinations of the nanotube growing surfaces 13a, 13b can be set with a high accuracy and that the growth time can be well controlled. If the growth time is excessively long, the nanotubes will grow from nanotube growing surfaces 13a, 13b into contact with each other, thus failing to form gap 6.

While in the foregoing embodiment, carbon nanotubes 5a, 5b are arranged in a V-shape, they may be arranged in a linear fashion. It should be noted however that detection of near-field light involves setting gap 6 in close proximity to the surface of a sample, where the V-shaped nanotubes are more suitable than linearly arranged nanotubes for such close proximity setting. For this reason, carbon nanotubes 5a, 5b arranged in a V-shape are more desirable as a practical configuration.

Figure 11:
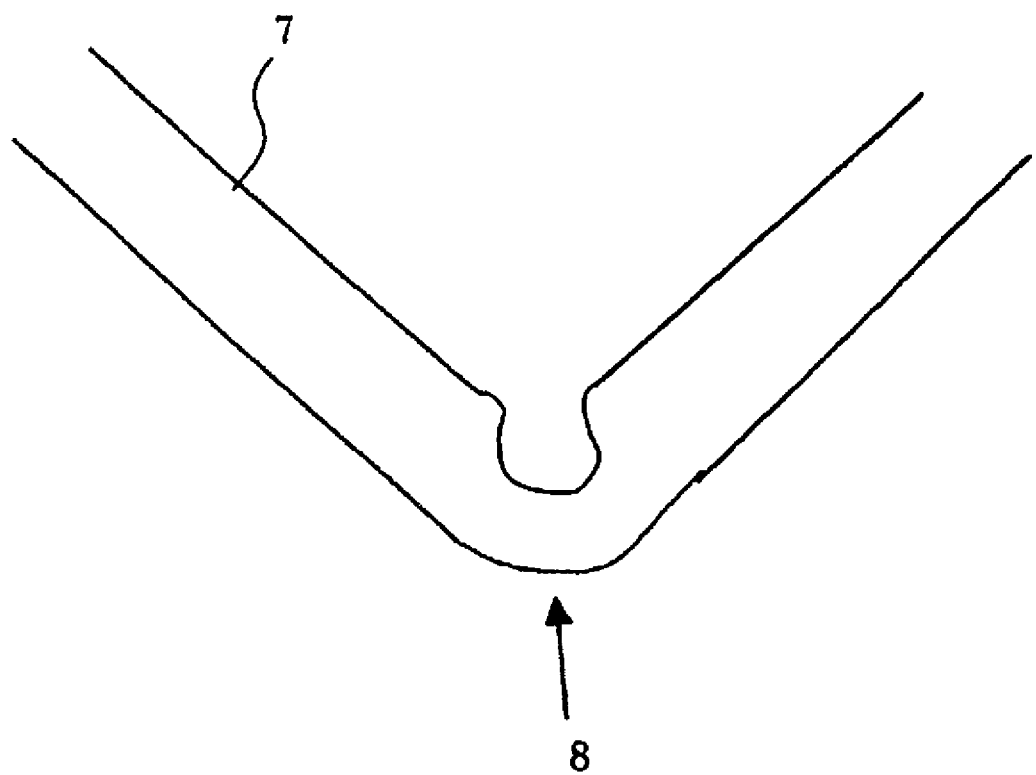
FIG. 11 is a schematic diagram illustrating a second embodiment of the near-field sensor shown in FIG. 4.

FIG. 11 illustrates a second embodiment of near-field light sensor 3 shown in FIG. 4. The near-field light sensor according to the second embodiment comprises a single carbon nanotube 7 which is mechanically bent. In the bent section 8 of the carbon nanotube 7, a bond angle of carbon atoms is closer to 100° to 110°, near the bond angle of diamonds, than to 120°, which is the bond angle of graphite, due to a stress produced when carbon nanotube 7 is bent, causing a bent section 8 to have an insulating property (see Sumio Iijima, Charles Brabec, Amitesh Maiti and Jerzy Bernholc, Journal of Chemical Physics Vol. 104 (No. 5), p2089, 1996). In the rest the carbon nanotube 7 maintains the bond angle of carbon atoms at "120°" equal to that of graphite.

According to the structure described above a bent section 8 causes the band gap to locally open. This can be also understood from the fact that, actually, graphite does not have a band gap in its electronic structure, whereas diamonds has a band gap of approximately 5 eV in its electronic structure. The size of the band gap in this event depends on the bond angle of the carbon atoms. The bond angle of the carbon atoms in bent section 8 should fall within a range which permits the operations in states (1) to (4) described above.

The near-field light sensor according to the second embodiment can also sense near-field light in a manner similar to the first embodiment. In the following, brief description will be made on the operation of sensing near-field light in the near-field light sensor according to the second embodiment.

When no near-field light is incident, a current generated through the tunnelling phenomenon alone flows through wire 2 (the same as the operation in "state (1)" described above).

As near-field light from a sample is incident in the vicinity of bent section 8, the electronic excitation is induced in areas (both sides) of carbon nanotube 7 separated by gap 6, which receive the near-field light, to generate electrons and holes. The excited electrons flow toward voltage source 1 in an area having a higher Fermi level, while the holes generated by the excitation flow toward voltage source 1 in an area having a lower Fermi level, causing a larger current to flow through wire 2 than when the near-field light is not incident (the same as the operation in "state (2)" described above).

When near-field light is produced at a location away from bent section 8 (for example, at a location several tens to several hundreds of angstrom away), electronic excitation is induced only on one side of the areas separated by bent section 8, causing a slightly larger current to flow through wire 2 than when the near-field light is not incident (the same as the operation in "state (3) and state (4)" described above). However, the amount of the current is smaller than when near-field light is incident in the vicinity of bent section 8.

In the second embodiment described above, the spatial resolution is determined by the size of a combination of bent section 8 and the excited areas of carbon nanotube 7 on both sides of bent section 8. While any size is available for bent section 8 as long as it ensures the operations in states (1)–(4) described above, bent section 8 is desirably sized to be approximate to the diameter of carbon nanotube 7 from a viewpoint of a highest possible spatial resolution.

Figure 12:
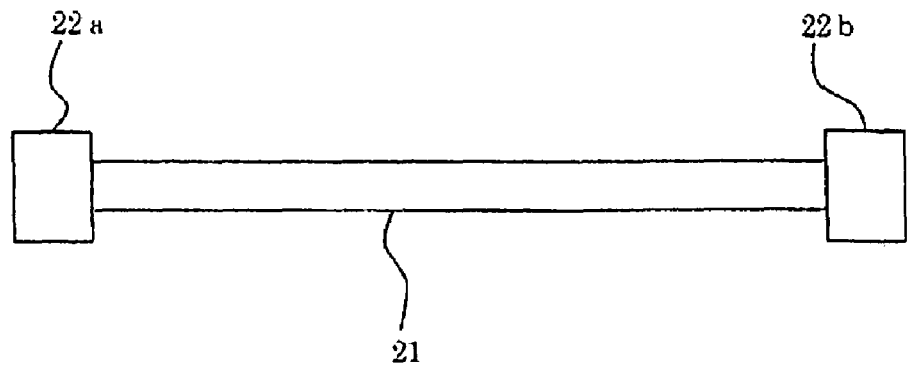
FIGS. 12a and 12b are schematic diagrams for explaining a method of fabricating a near-field light sensor having a carbon nanotube shown in FIG. 11.
Figure 12:
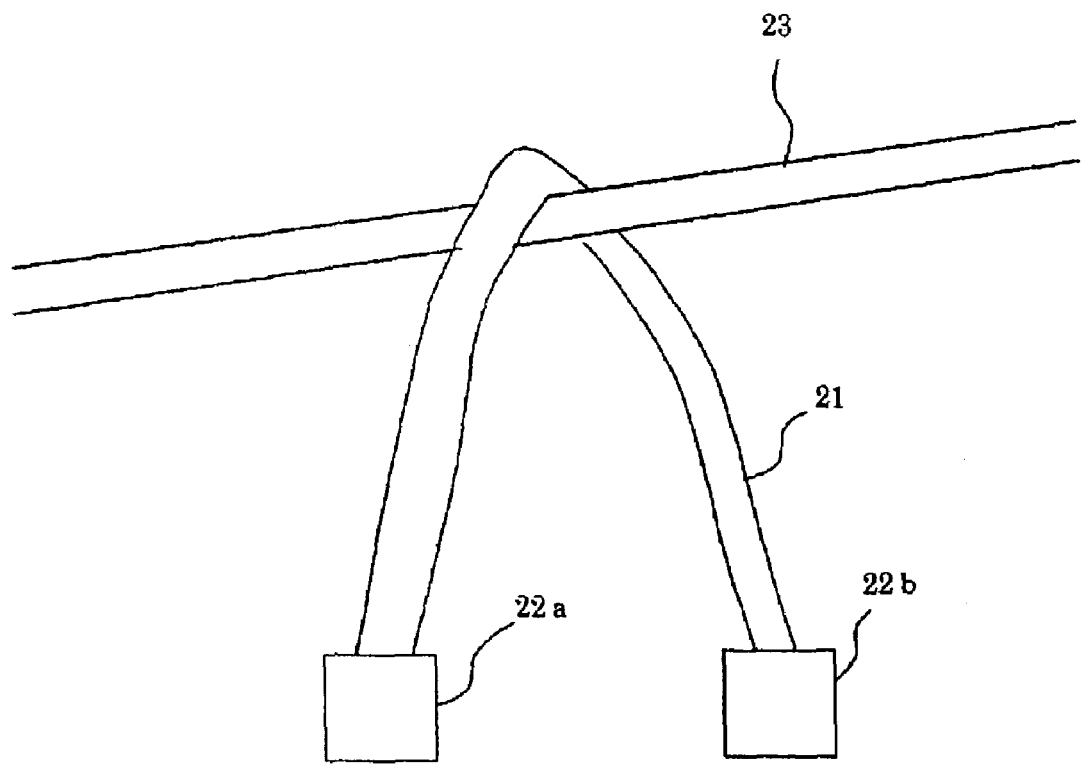

Next, description will be given of a procedure for fabricating the near-field light sensor according to the second embodiment. FIGS. 12a and 12b schematically illustrate a technique of fabricating the near-field light sensor having a carbon nanotube illustrated in FIG. 11.

It is difficult to bond both ends of a mechanically bent carbon nanotube to the electrodes. To overcome this difficulty, carbon nanotube 21 is formed to extend between two catalyst electrodes 22a, 22b, as illustrated in FIG. 12a. For example, catalyst electrodes 22a, 22b are arranged such that their nanotube growing surfaces (on which a catalyst metal has been vapor deposited) oppose each other. Then, a nanotube is grown by a CVD method from one surface, and bonded to the other surface to form a carbon nanotube 21.

Next, catalyst electrodes 22a, 22b are respectively set in a known manipulator, and carbon nanotube 21 is arranged to cross nanotube 23 which has been separately fabricated to have a desired diameter-, as illustrated in FIG. 12b. Then, catalyst electrodes 22a, 22b are unidirectionally moved to press a central region of carbon nanotube 21 against nanotube 23. In this event, carbon nanotube 21 is fixed at both ends, and applied with such a tension that prevents nanotube 21 from being bent even if nanotube 23 is pressed thereagainst.

As catalyst electrodes 22a, 22b are further moved, carbon nanotube 21 is bent near the center thereof along the outer periphery of nanotube 23. The angle at which carbon nanotube 21 is bent in this event is determined by the diameter of nanotube 23. As nanotube 23 is removed with carbon nanotube 21 being thus bent, the bent portion of carbon nanotube 21 is maintained in this shape (metastable state), thereby resulting in the carbon nanotube having a bent structure as illustrated in FIG. 11.

While the nanotube is grown by the CVD method in the first and second embodiments, a known arc method may be used instead of the CVD method.

In addition, while each of the foregoing embodiments has given an example which uses a carbon nanotube, the present invention is not limited to the nanotube made by carbon. Rather, any material can be used for the nanotube as long as it is capable of sensing near-field light through the electronic excitation. For example, boron nitride may be used for a nanotube.

In the near-field light detecting apparatus according to the embodiment described above, a single near-field light sensor alone is shown in the configuration illustrated in FIG. 4. The present invention, however, is not limited to the use of a single near-field light sensor, but a plurality of near-field light sensors may be provided in a near-field light detecting apparatus.

(State Analyzing Apparatus)

The near-field light detecting apparatus according to the present invention described above can be applied to a state analyzing apparatus for analyzing a surface state (shape, characteristics or the like) of a sample by utilizing near-field light. The state analyzing apparatus mainly comprises an illumination system for illuminating a sample (including cells) from a predetermined direction to produce near-field light on the surface of the sample; a photoelectric converter which has a nanotube for converting the near-field light produced on the surface of the sample into an electric signal; and an analyzer for analyzing the state on the surface of the sample based on the electric signal converted by the photoelectric converter. The photoelectric converter has the same configuration as the near-field light sensor illustrated in FIG. 4. The analyzer analyzes the micro-structure (shape) on the surface of a sample, optical characteristics of single molecules, and the like.

The following description will be made on the configuration of a scanning near-field light microscope which is given as an example of the state analyzing apparatus.

Figure 13:
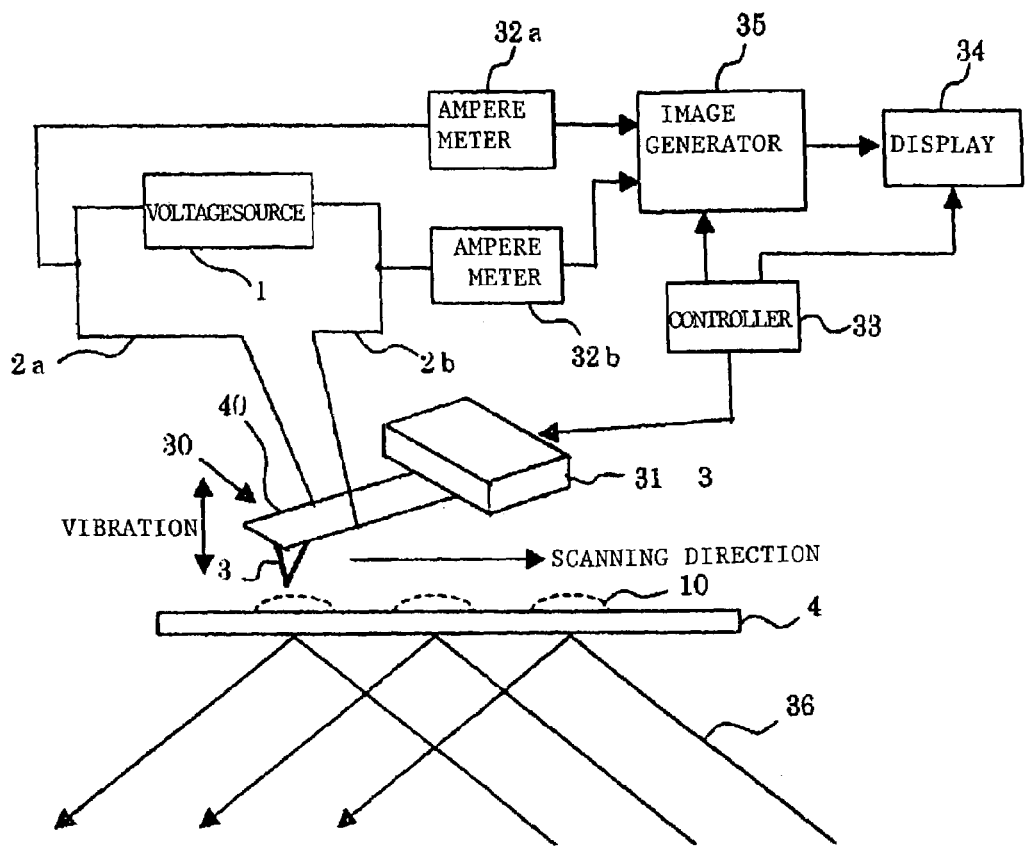
FIG. 13 is a block diagram generally illustrating the configuration of a scanning near-field optical microscope which applies the near-field light detecting apparatus illustrated in FIG. 4.
Figure 14:
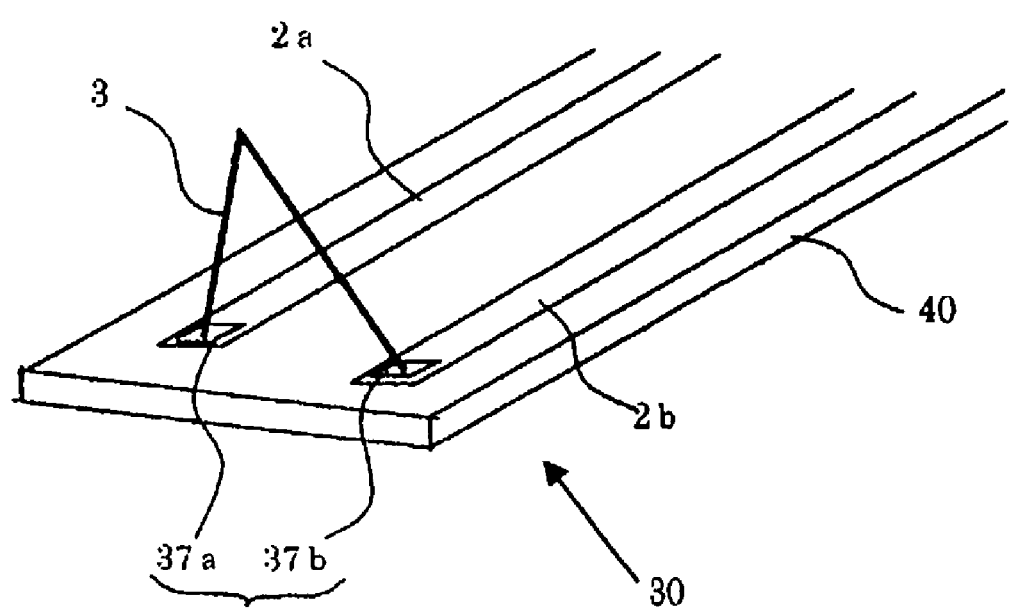
FIG. 14 is a perspective view generally illustrating the structure of a probe used in the scanning near-field optical microscope illustrated in FIG. 13.

FIG. 13 generally illustrates the configuration of a scanning near-field optical microscope which applies the near-field light detecting apparatus illustrated in FIG. 4, and FIG. 14 generally illustrates the configuration of a probe which is used in the scanning near-field optical microscope.

In FIG. 13, a probe 30 comprises a probe substrate 40 having one end fixed to a three-dimensional driver 31, and a V-shaped near-field light sensor 3 having a single or a pair of nanotubes, as illustrated in FIG. 4, disposed at the other end (leading end) of probe substrate 40. The nanotube which constitutes a near-field light sensor 3 has both ends electrically connected to wires 2a, 2b through electrodes 37a, 37b, respectively, as illustrated in FIG. 14. Each of wires 2a, 2b is connected to a voltage source 1. The ampere meters 32a, 32b are disposed on wires 2a, 2b, respectively.

A three-dimensional driver 31 comprises an actuator (not shown) having a piezo element or the like, well known in an atomic force microscope (AFM), and can vibrate probe 30 near its resonant frequency. The three-dimensional driver 31 further comprises a moving mechanism (not shown) which can two-dimensionally scan a probe 30 over the surface of sample 4.

A controller 33 controls three-dimensional driver 31 allowing the probe 30 to be vibrated and move. Specifically, controller 33 can control three-dimensional driver 31 in two modes: a first mode for measuring asperities on the surface of sample 4 by the action of a well known atomic force microscope (AFM), and a second mode for sensing near-field light produced on the surface of sample 4 with near-field light sensor 3 while scanning the surface of sample 4 with probe 30, with a constant distance maintained between near-field light sensor 3 and the surface of sample 4 (distance at which near-field light can be sensed), with reference to the result of the AFM measurement.

An image generator 35 generates a three-dimensional image of a near-field light image (intensity distribution) related to the surface of sample 4 from outputs of ampere meters 2a, 2b during the second mode control. The image generated by generator 35 is supplied to display 4. Controller 33 also controls generation of the image in image generator 35, and display of the generated image on display 34.

Next, description will be given on specific operations in the scanning near-field optical microscope described above. Near-field light produced on the surface of sample 4 decreases suddenly as it is moved further away from the surface. For this reason, near-field light sensor 3 must be positioned at a distance from the surface of sample 4 (for example, up to 10 nm) at which the near-field light can be sensed thereby, and the distance from the surface must be held constant. To satisfy these requirements, the near-field optical microscope has two modes: the first mode (AFM measurement) and second mode (near-field light measurement).

In the first mode (AFM measurement), probe 30, vibrated near its resonant frequency, is scanned over the surface of sample 4. During the scanning, the amplitude of vibrations of probe 30 is detected, for example, by a known optical lever based detector (not shown). Then, controller 33 controls the distance between the leading end (bent section) of near-field light sensor 3 and the surface of sample 4 such that the result of the detection remains unchanged, i.e., such that the amplitude of vibrations of the probe 30 is evenly affected by an atomic force produced between the leading end (bent section) of near-field light sensor 3 and the surface of sample 4 (attenuated amplitude or shifted amplitude frequency). Thus by controlling the distance, the scanning near-field optical microscope measures the shape, i.e., asperities on the surface of sample 4.

In the second mode, the back of sample 4 is illuminated by illumination light 36 from an illumination system, not shown, to produce near-field light 10 on the surface of sample 4. Then, with reference to the shape, i.e., asperities on the surface of sample 4 acquired in the first mode, controller 33 controls near-field light sensor 3 to scan the surface of sample 4 while maintaining a constant distance between near-field light sensor 3 and the surface of sample 4. By thus controlling near-field light sensor 3, the scanning near-field optical microscope can measure near-field light 10 produced on the surface of sample 4. The result of the near-field light measurement (distribution of near-field light intensity) is displayed on display 34 as a three-dimensional image.

In the embodiment illustrated in FIG. 13, illumination light 5 is irradiated from the back of sample 4 for producing near-field light 10. However, the illumination light may be irradiated in any way as long as near-field light is produced. For example, illumination light may be irradiated from the surface of sample 4.

Also, while two ampere meters 32a, 32b are used in the foregoing embodiment, only one of these ampere meters may be used.

Further, a plurality of probes 30 may be provided to reduce an overall time required for the scanning. In this case, however, the respective proves must be corrected for a difference in sensitivity, and the like.

Figure 1:
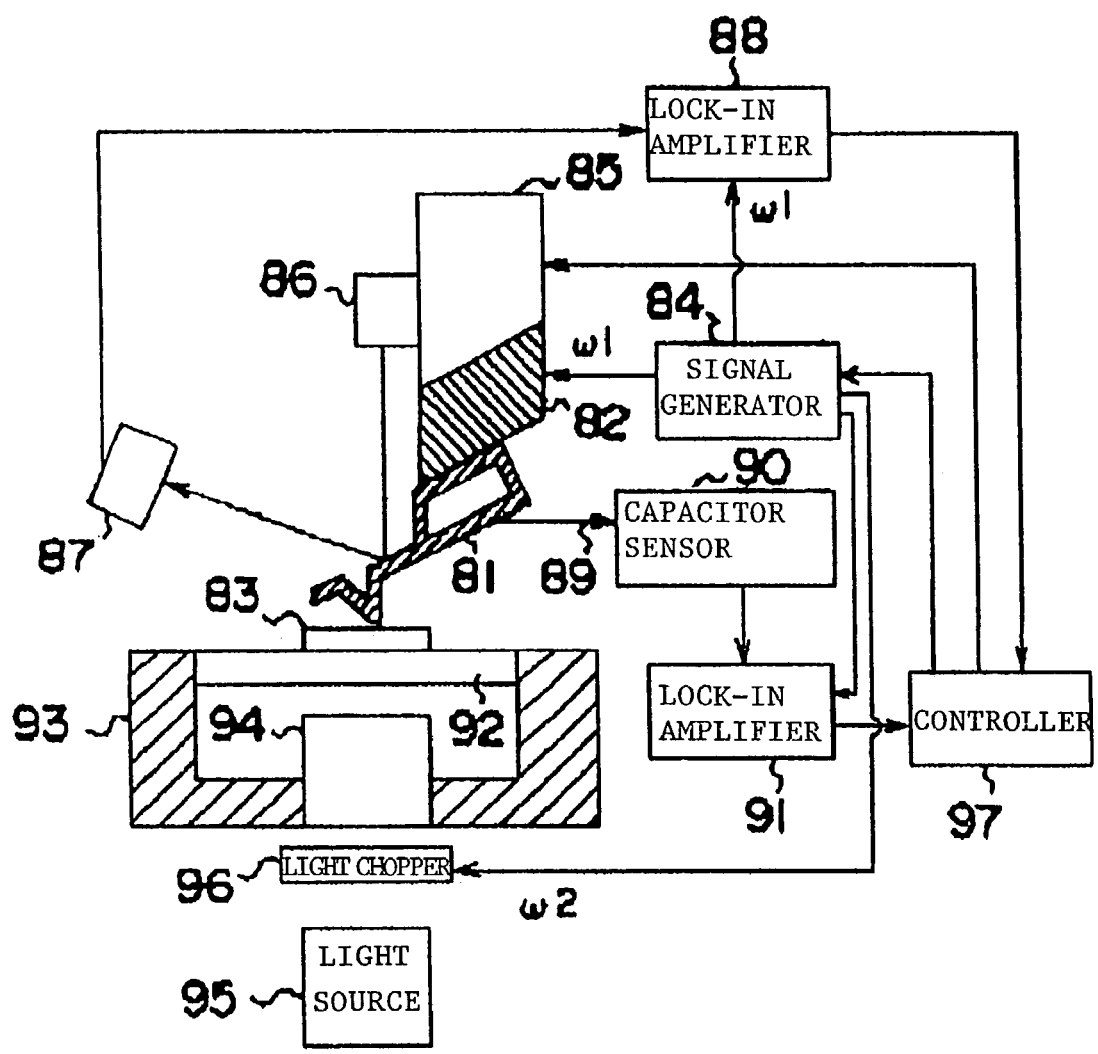
FIG. 1 is a block diagram generally illustrating the configuration of a scanning probe microscope described in JP-A-10-170523.
Figure 2:
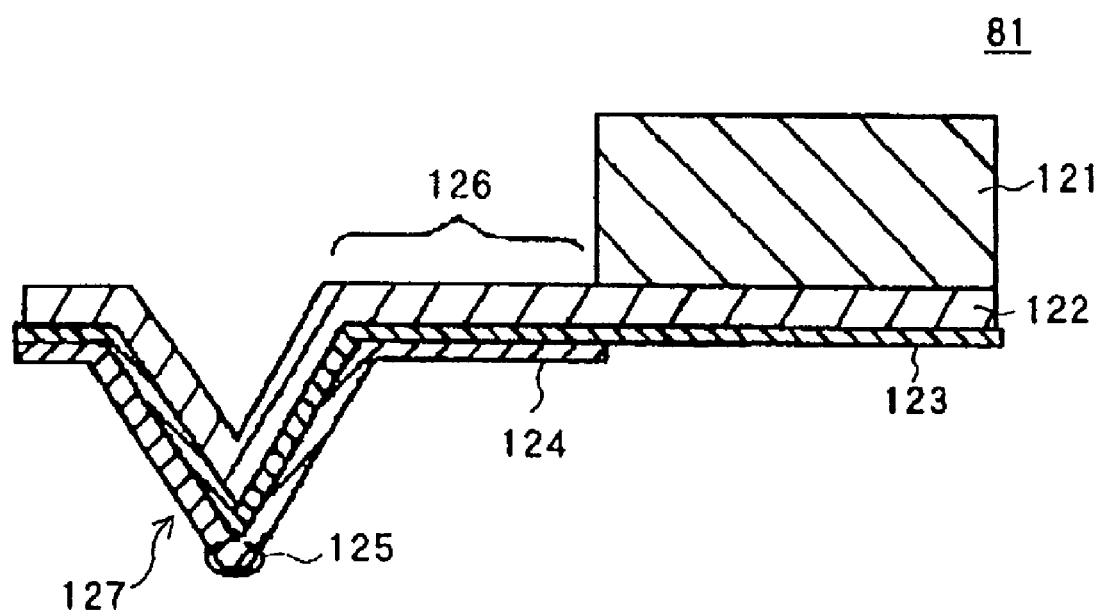
FIG. 2 is a cross-sectional view generally illustrating the configuration of a probe cantilever shown in FIG. 1.
Figure 3A:
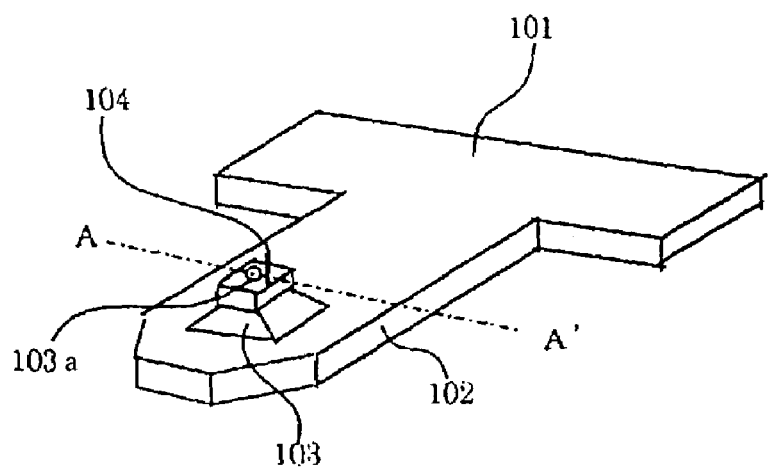
FIG. 3a is a perspective view generally illustrating the structure of a probe for a scanning near-field microscope described in JP-A-2001-281124.
Figure 3B:
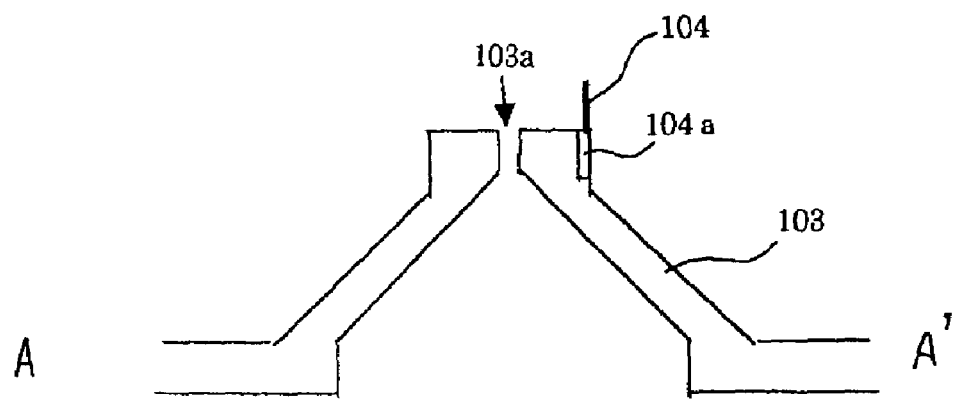

The embodiment illustrated in FIG. 13 is a simple exemplary application of the present invention, and the present invention is not limited to the illustrated embodiment. For example, the present invention can be applied to the scanning probe microscope (see FIG. 1) described in the aforementioned JP-A-10-170523. In this case, the feature for detecting a change in capacitance is replaced by the feature for detecting a change in current based on the electronic excitation caused by near-field light in the present invention.

The present invention can also be applied to other than the aforementioned near-field optical microscope, for example, to an apparatus which utilizes near-field light to read information recorded on an ultra high density optical disk. For example, when the information corresponding to "0" and "1" is recorded on a recording surface of an optical disk, wherein the intensity of near-field light produced on the recording surface changes in accordance with the information "0," "1" recorded thereon, the apparatus illustrated in FIG. 4 can be used to detect the change in the intensity of near-field light to read the information.

As described above, the spatial resolution on the order of several tens of angstrom, realized by the present invention, permits the identification of a part at which near-field light is produced, and the location of a near-field light emitter at a molecular level, leading to the ability to perform evaluations and analyses on micro-areas which have been so far impossible.

While preferred embodiments of the present invention have been described using specific terms, such description is for illustrative purposes only, and it is to be understood that changes and variations may be made without departing from the spirit or scope of the following claims.

What is claimed is:

1. A nanotube for converting near-field light into an electric signal, comprising:
   an insulating area; and
   a first and a second area separated by said insulating area, said near-field light inducing electronic excitation in said first and second areas to convert said near-field light into said electric signal.

2. The nanotube according to claim 1, wherein a current generated by the electronic excitation induced by said near-field light is larger than a tunnelling current generated by applying a predetermined bias voltage between said first and second areas.

3. The nanotube according to claim 1, comprising:
   a first nanotube including said first area; and
   a second nanotube including said second area,
   wherein said first and second nanotubes have ends arranged in close proximity to each other across a spatial gap of a predetermined size, and
   said insulating area comprises said spatial gap of the predetermined size.

4. The nanotube according to claim 3, wherein said first and second nanotubes are arranged in a V-shape.

5. The nanotube according to claim 3, wherein said first and second nanotubes are made of carbon or boron nitride.

6. The nanotube according to claim 1, comprising:
   a nanotube bent at a predetermined angle, said nanotube including said first and second areas and said insulating area,
   wherein said insulating area comprises a bent section of said nanotube.

7. The nanotube according to claim 6, wherein a bond angle of atoms in said insulating area is smaller than a bond angle of atoms in said first and second areas.

8. The nanotube according to claim 7, wherein said bond angle of atoms in said insulating area is in a range of 100° to 110°, and said bond angle of atoms in said first and second areas is 120°.

9. The nanotube according to claim 6, wherein said nanotube is made of carbon or boron nitride.

10. A near-field light detecting apparatus comprising:
a nanotube having an insulating area and a first and a second area separated by said insulating area;
a voltage source for applying a predetermined bias voltage to said nanotube; and
a detecting mechanism for detecting a first current generated by the application of said predetermined bias voltage and flowing through said nanotube, and a second current generated by electronic excitation induced by external near-field light in said first and second areas, said second current flowing through said nanotube.

11. The near-field light detecting apparatus according to claim 10, wherein said second current is larger than said first current.

12. The near-field light detecting apparatus according to claim 10, wherein:
said nanotube comprises a first and a second nanotube section;
said first and second nanotube sections have ends arranged in close proximity to each other across a spatial gap of a predetermined size; and
said insulating area comprises said spatial gap of the predetermined size.

13. The near-field light detecting apparatus according to claim 12, wherein said first and second nanotube sections are arranged in a V-shape.

14. The near-field light detecting apparatus according to claim 10, wherein:
said nanotube comprises a nanotube section bent at a predetermined angle; and
said insulating area is formed by a bent section of said nanotube.

15. The near-field light detecting apparatus according to claim 14, wherein a bond angle of atoms in said insulating area is smaller than a bond angle of atoms in said first and second areas.

16. The near-field light detecting apparatus according to claim 15, wherein said bond angle of atoms in said insulating area is in a range of 100° to 110°, and said bond angle of atoms in said first and second areas is 120°.

17. The near-field light detecting apparatus according to claim 10, wherein said nanotube is made of carbon or boron nitride.

18. A near-field light detecting method using a nanotube having an insulating area and a first and a second area separated by said insulating area, said method comprising the steps of:
applying a predetermined bias voltage between said first and second areas of said nanotube;
measuring a first current generated by the application of said predetermined bias voltage and flowing through said nanotube; and
measuring a second current generated by electronic excitation induced by near-field light under detection in said first and second areas, said second current flowing through said nanotube.

19. A state analyzing apparatus comprising:
a nanotube having an insulating area and a first and a second area separated by said insulating area;
a voltage source for applying a predetermined bias voltage to said nanotube;
a detecting mechanism for detecting a first current generated by the application of said predetermined bias voltage and flowing through said nanotube, and a second current generated by electronic excitation induced in said first and second areas by near-field light produced on the surface of a sample, said second current flowing through said nanotube; and
an analyzing mechanism for analyzing a state on the surface of said sample based on said first and second currents detected by said detecting mechanism.

20. The state analyzing apparatus according to claim 19, wherein said second current is larger than said first current.

21. The state analyzing apparatus according to claim 19, wherein:
said nanotube comprises a first and a second nanotube section;
said first and second nanotube sections have ends arranged in close proximity to each other across a spatial gap of a predetermined size, and
said insulating area comprises said spatial gap of the predetermined size.

22. The state analyzing apparatus according to claim 21, wherein said first and second nanotube sections are arranged in a V-shape.

23. The state analyzing apparatus according to claim 19, wherein:
said nanotube comprises a nanotube section bent at a predetermined angle; and
said insulating area is formed by a bent section of said nanotube.

24. The state analyzing apparatus according to claim 23, wherein a bond angle of atoms in said insulating area is smaller than a bond angle of atoms in said first and second areas.

25. The state analyzing apparatus according to claim 24, wherein said bond angle of atoms in said insulating area is in a range of 100° to 110°, and said bond angle of atoms in said first and second areas is 120°.

26. The state analyzing apparatus according to claim 19, wherein said nanotube is made of carbon or boron nitride.

27. A scanning near-field optical microscope comprising:
a nanotube having an insulating area and a first and a second area separated by said insulating area;
a voltage source for applying a predetermined bias voltage to said nanotube;
a detecting mechanism for detecting a first current generated by the application of said predetermined bias voltage and flowing through said nanotube, and a second current generated by electronic excitation induced in said first and second areas by near-field light produced on the surface of a sample, said second current flowing through said nanotube;
a probe having said nanotube mounted at a leading end thereof;
a movement control mechanism for scanning said probe in a predetermined direction while maintaining a constant distance between said nanotube and the surface of said sample; and
an image generating mechanism for generating an image of said near-field light related to the surface of said sample based on said first and second currents detected by said detecting mechanism.

* * * * *